US010888809B2

(12) United States Patent
Gunnefur et al.

(10) Patent No.: US 10,888,809 B2
(45) Date of Patent: Jan. 12, 2021

(54) FOLDABLE AIR FILTER UNIT

(71) Applicant: Blueair AB, Stockholm (SE)

(72) Inventors: Jacob Gunnefur, Stockholm (SE); Jakob Mingettig, Stockholm (SE)

(73) Assignee: Blueair AB, Stockholm (SE)

( * ) Notice: Subject to any disclaimer, the term of this patent is extended or adjusted under 35 U.S.C. 154(b) by 333 days.

(21) Appl. No.: 15/936,958

(22) Filed: Mar. 27, 2018

(65) Prior Publication Data

US 2018/0304184 A1    Oct. 25, 2018

(30) Foreign Application Priority Data

Apr. 24, 2017  (SE) ........................................ 1750484
Jun. 14, 2017  (SE) ........................................ 1750758

(51) Int. Cl.
| | | |
|---|---|---|
| *B01D 46/00* | (2006.01) | |
| *B01D 46/52* | (2006.01) | |
| *F24F 13/28* | (2006.01) | |
| *B01D 46/24* | (2006.01) | |

(52) U.S. Cl.
CPC ...... *B01D 46/0016* (2013.01); *B01D 46/2411* (2013.01); *B01D 46/521* (2013.01); *F24F 13/28* (2013.01); *B01D 2273/14* (2013.01); *B01D 2275/205* (2013.01); *F24F 2221/36* (2013.01)

(58) Field of Classification Search
CPC ............ B01D 46/0002; B01D 46/0016; B01D 46/2411; B01D 2275/205; B01D 46/521; B01D 2273/14; F24F 2221/36
See application file for complete search history.

(56) References Cited

U.S. PATENT DOCUMENTS

| | | | |
|---|---|---|---|
| 3,818,948 | A | 6/1974 | Hedges |
| 5,743,927 | A | 4/1998 | Osendorf |
| 6,311,735 | B1 | 11/2001 | Small, Sr. |
| 7,410,520 | B2 | 8/2008 | Nowak et al. |
| 2010/0050581 | A1 | 3/2010 | Schuld |
| 2015/0267927 | A1 | 9/2015 | Zhang et al. |

(Continued)

FOREIGN PATENT DOCUMENTS

| | | |
|---|---|---|
| CN | 1727041 | 2/2006 |
| CN | 107995876 | 5/2018 |
| CN | 108211572 | 6/2018 |

(Continued)

OTHER PUBLICATIONS

Espacenet English Translation of Bae et al. (WO 2017/026761).*

(Continued)

*Primary Examiner* — Jonathan Luke Pilcher
(74) *Attorney, Agent, or Firm* — Greenberg Traurig, LLP

(57) ABSTRACT

An air filter unit for purifying air. The air filter unit includes a filter body extending along an axis, a first filter frame and a second filter frame arranged on opposite ends of said filter body. Each of the first and second filter frame includes four elongated frame members turnably secured to each other. The four elongated frame members are turnably secured to each other such that the filter body could be arranged in a first and a second state. The first state is such that the filter body is folded to reduce the volume of the filter unit and the second state is such that the filter body is assembled.

13 Claims, 4 Drawing Sheets

(56) References Cited

U.S. PATENT DOCUMENTS

2018/0221805 A1 †  8/2018  Bae

FOREIGN PATENT DOCUMENTS

| | | | |
|---|---|---|---|
| DE | 7039913 | | 3/1971 |
| DE | 3744270 | | 7/1989 |
| DE | 4004343 | | 8/1991 |
| DE | 19804927 | | 8/1998 |
| EP | 1 847 309 | † | 10/2007 |
| EP | 1847309 | | 10/2007 |
| JP | 06-226024 | † | 8/1994 |
| JP | H06226024 | | 2/1999 |
| JP | H06226024 A | | 2/1999 |
| JP | 2000280737 | | 10/2000 |
| JP | 2005007361 | | 1/2005 |
| JP | 2012148259 | | 8/2012 |
| KR | 200369798 | | 12/2004 |
| KR | 20150005594 | | 1/2015 |
| WO | WO 2017/026761 | † | 2/2017 |
| WO | WO2017026761 | | 2/2017 |

OTHER PUBLICATIONS

Corresponding Swedish Application 1750484-6, Swedish Search Report dated Nov. 21, 2017.
Corresponding Swedish Application 1750758-3, Swedish Search Report dated Nov. 21, 2017.
Corresponding Swedish Application 1750758-3, Swedish Office action dated Nov. 21, 2017.

\* cited by examiner
† cited by third party

FOLDABLE AIR FILTER UNIT

TECHNICAL FIELD

The present invention relates to an air filter unit for purifying air.

BACKGROUND

Air filter units are used for cleaning indoor air from pollutants. Conventional air filter units comprise a filter arranged to filter an air flow produced by a fan, whereby air-borne particles and other impurities are removed from the air.

Unfortunately, the filters that are commercially available for use in air purifier devices have a number of shortcomings. First, in order not to limit the flow of air and provide the desired purification, the filter must have a significant area and consequently a considerable size which makes it relatively expensive to transport and store replacement filters due to the bulky design.

It is therefore desirable to develop an air filter which, while still providing the desired purification, alleviates the difficulties of shipping and storing the replacement filters.

SUMMARY OF THE INVENTION

The present invention relates to an air filter unit that to at least some extent eliminates or reduces the drawbacks mentioned above.

To better address one or more of these concerns, an air filter unit having the features defined in the independent claim is provided. Preferable embodiments are defined in the dependent claims.

The air filter unit according to the invention comprises:
 a filter body extending along an axis A, and
 a first filter frame and a second filter frame arranged on opposite ends of said filter body, each of said first and second filter frame comprising four elongated frame members turnably secured to each other,
 wherein said four elongated frame members are turnably secured to each other such that said filter body could be arranged in a first and a second state, wherein the first state is such that the filter body is folded to reduce the volume of the filter unit and the second state is such that the filter body is assembled.

The air filter unit according to the invention is based on the idea of structurally dividing the air filter unit into a filter body, a first filter frame and a second filter frame. The first and second filter frame, each having four elongated frame members turnably secured to each other, arranged in opposite ends of the filter body enables the filter unit to be folded and thereby reduce the overall volume of the air filter unit which facilitates the transport since the volume is reduced considerably.

According to one embodiment, the filter body, the first filter frame and the second filter frame in the second state have a rectangular cross section transverse to axis A. This embodiment is very favorable since the volume of this air filter unit is reduces considerably when arranged in the first state.

According to one embodiment, the filter body comprises four side walls that are rectangular and turnably secured to each other along the sides parallel to axis A. This embodiment provides a filter unit that is easy to fold since all side walls are turnably secured to each other.

According to one embodiment, each elongated frame member comprises a recess such that the frame members are fitted to the corresponding side wall of the filter body. The recess ensures that each elongated frame members are correctly secured to the side walls of the filter body when the air filter unit is assembled. Advantages associated with modular based assembly is minimizing cost, by reducing the number of parts and savings in design and assembly time.

According to one embodiment, the elongated frame members have a substantially rectangular shape and are turnably connected to each other by a thin elastic and/or flexible element in the inner corners of adjacent frame members. This embodiment provides a less complicated filter unit with the desired folding characteristics.

According to one embodiment, each of the first and second filter frame is formed by a first and a second substantially identical filter frame section, said first filter frame section comprising two of the four elongated frame members and said second filter frame section comprising the remaining two of the four elongated frame members. The first and second filter frame are structurally divided into two substantially identical parts making the manufacturing and assembling of the air filter unit more efficient.

According to one embodiment, the two elongated frame member of each filter frame section are connected via a foldable element to be turnably connected within a range of 90-180 degrees. The element ensures a reliable and simple foldable connection between the two frame members. The adjacent elongated frame members of each filter frame section and the foldable element are either formed as one single element or divided into separate parts joined together during assembly of the filter frame section.

According to one embodiment, the first and the second filter frame section are connected via a turnable coupling mechanism, turnable within a range of 0-90 degrees. The turnable coupling mechanism facilitates the assembly of the first and second filter frame section to each other.

According to one embodiment, each coupling mechanism comprises a male part arranged on one of the first or second filter frame section and a female part arranged on the other filter frame section, wherein said male and female part are arranged to turnably secure said first and second filter frame section to each other. This embodiment of the coupling mechanism makes it possible to manufacture the first and second frame section separately and assembly the two sections to form the turnable coupling between the sections.

According to an embodiment, each coupling mechanism comprises a central hub arranged on one of the first or second filter frame section (80), said central hub define the axis of rotation for the coupling mechanism. This embodiment provides a reliable coupling mechanism that is turnable around the central hub.

According to an embodiment, wherein the coupling mechanism furthermore comprises an arc-shaped recess (150) extending around the central hub and a corresponding arc-shaped protrusion arranged on the other filter frame section, wherein the arc shaped protrusion is slidably arranged in the recess when the first and second filter frame section are assembled.

According to an embodiment, the filter unit is a disposable filter unit. Alternatively, the first and second filter frame are reusable and the filter walls are disposable.

Further scopes of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
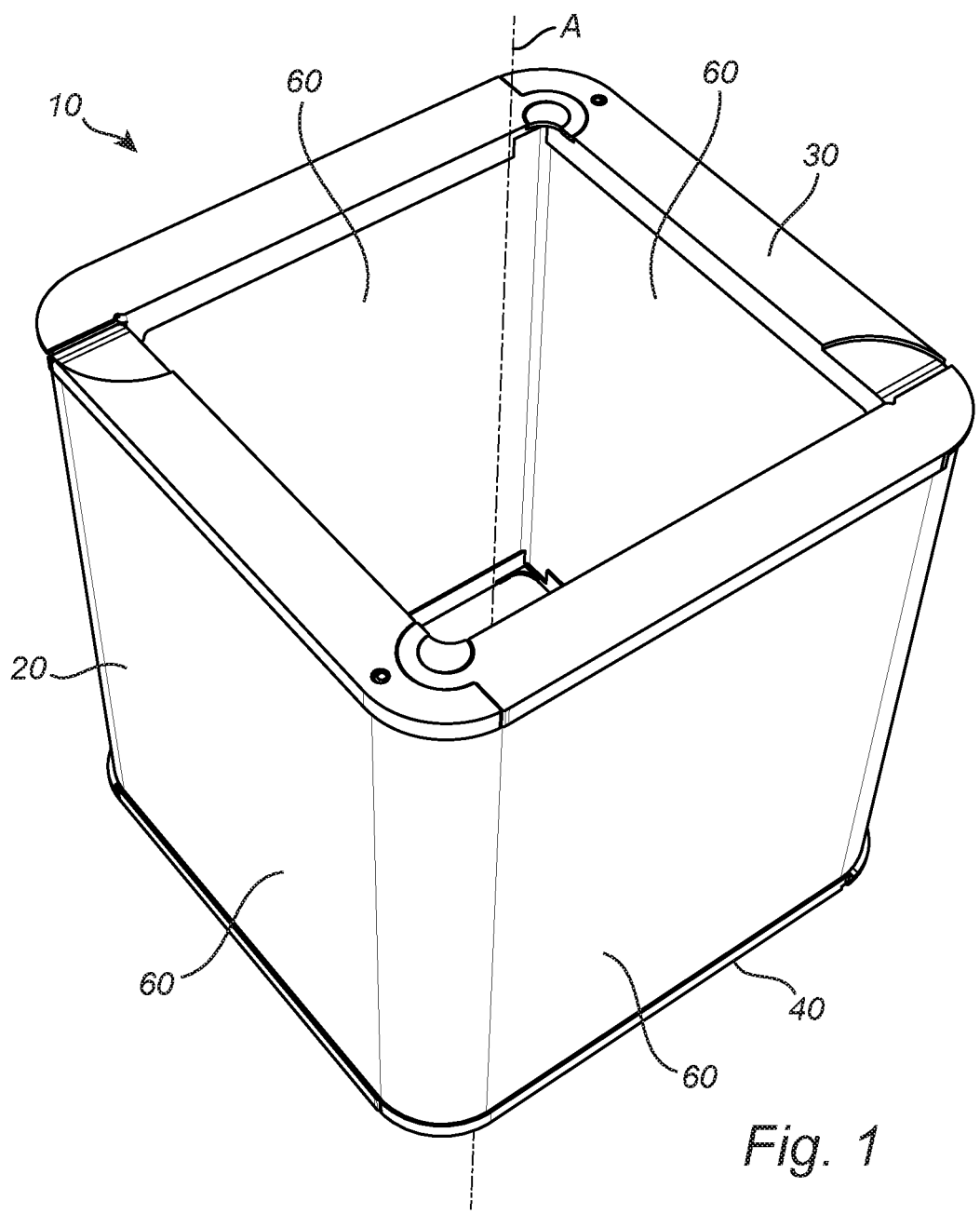
FIG. 1 illustrates the air filter unit assembled and arranged in the second state, i.e. positioned for use in an air purifier.

FIG. 1 illustrates an example of an air filter unit 10, which may be suitable for purifying air in indoor spaces. The air filter unit extend along a longitudinal axis A. The air filter unit 10 has a box-like shape, optionally with one or more rounded outer edges, and is designed to fit in a corresponding air purifying device, not illustrated.

The air filter unit 10 has a substantially rectangular cross-section transverse to axis A, as illustrated in FIG. 1.

The air filter unit 10 comprises three structural parts: a filter body 20, in which the filter media is arranged, a first filter frame 30 and a second filter frame 40.

The filter body 20 comprises four rectangular side walls 60 being turnably secured to each other along the sides parallel to axis A. One or more of the side walls 60 consist of filter media, or comprises a part formed of a filter material, and extends circumferentially around the filter body 30 such that an open interior is formed within the filter body. Preferably all four side walls are made of filter material to the maximize the filter area. In the illustrated embodiment the side walls have a substantially constant wall thickness.

The first filter frame 30 is arranged on the top side of the filter body 20, and the second filter frame 40 is arranged on the bottom side of the filter body 30 in the illustrated embodiment. The first and second filter frame supports the opposite ends of the filter body to provide the desired structural strength of the air filter unit. The first and second filter frame have substantially identical design to reduce the number of different components in the air filter unit.

Each filter frame 40 comprise four elongated frame members turnably secured to each. The frame members are substantially straight and has a length corresponding to the side walls of the filter unit. The frame members of the filter frames are turnably connected to each other around axes extending parallel to axis A in each corner of the rectangular filter frame. Along the side of the frame members facing the filter body a recess is formed. The recess has a width corresponding to the thickness of the side walls such that the filter frame during assembly is fitted to the filter body.

The air filter unit 10 is foldable by pushing the diagonally opposite corners of the air filter unit to be changed between the first and second state.

Figures 2A, 2B:
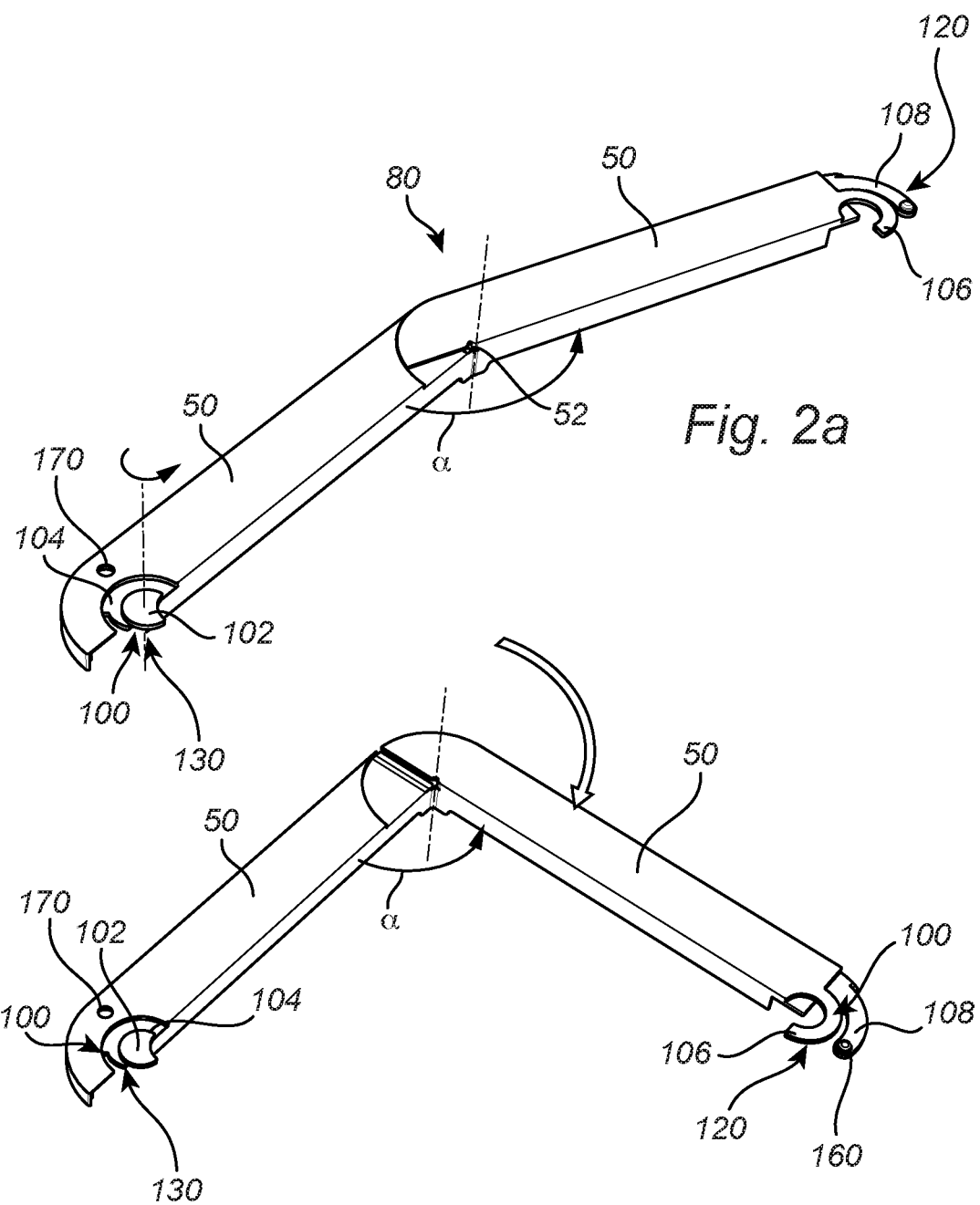
FIG. 2a illustrates a perspective view of one of the first and second frame section in a first position.
FIG. 2b illustrates a perspective view of one of the first and second frame section in a second position.

Both the first and second filter frame are formed of two substantially identical filter frame sections 80. One filter frame section arranged in a first position is illustrated in FIG. 2a and in a second position in FIG. 2b.

The two elongated frame members 50 that together form the filter frame section 80 are connected with each other via a foldable element 52 arranged in the position where the edge of the side walls of the filter meet to turnably connect the two frame members. The elastic element makes it possible to arrange the two frame members in a positions where the angle α is within a range of 90-180 degrees, i.e. the frame members are arranged perpendicular to each other or extend along one line.

Each filter frame comprises two substantially identical filter frame sections 80, i.e. a first and a second filter frame section. The two filter frame sections are turnably connected to each other by one coupling mechanisms 100 arranged in each end of filter frame sections.

The locking mechanism ensures that the first filter frame section 80 and second filter frame section 90 are turnably coupled to each other to form said filter frame (30,40). The coupling mechanism comprise a male connector part 120 and a female connector part 130. The male connector part is arranged on one of the adjacent frame members and the female connector part on the adjacent frame member to connect adjacent frame members. An identical coupling mechanism is also arranged in the opposite end of the filter frame sections 90. The male and female connector part are arranged to turnably secure and couple the first filter frame section with the second filter frame section and form the filter frame (30,40).

Each coupling mechanism comprises a centrally arranged hub 102 arranged in one end of the filter frame section 80. The central hub defines the axis of rotation for the coupling mechanism. The axis of rotation is preferably arranged coaxially with the inner corner of the side walls. Around the central hub, an arc-shaped recess 104 extend and on the corresponding end of the other filter frame section a corresponding arc-shaped protrusion 106 is arranged such that, after assembly of the two frame sections, the arc shaped protrusion is slidably arranged in the recess.

The coupling mechanism furthermore comprises a second protrusion 108 intended to be arranged on opposite side of the frame member as the first protrusion 106 to maintain and lock the adjacent frame member in the assembled state in the coupling mechanism.

Hence, the air filter unit 10 may be foldable by a single action (or movement) by the user, whereby folding the filter unit 10 is facilitated as a result of two movable different filter frame sections. Separating the filter frame into two structurally identical filter frame sections reduces the number of different components during manufacturing.

The embodiment of the first and second filter frame section illustrated in FIGS. 2a and 2b, comprises a snap-lock 160 is intended to lock the air filter unit in the second assembled state ready for use. The snap-lock comprises a protrusion that extend from the arc-shaped recess 150 and a corresponding recess or hole 170 arranged in the arc-shaped male protrusion adapted to receive the locking protrusion and secure the first and second filter frame section in the second state.

The two snap protrusions may be two release buttons, and the filter frame may be divided into two parts by pushing the two release buttons, which further facilitates removal of the filter frame from the air filter unit. In the present embodiment, the pushing action performed by the user both actuates the release buttons and pinches (grabs) the filter frame for lifting it off from the air filter unit, whereby reducing volume and the air filter unit is foldable and more intuitive for the user.

Figure 3:
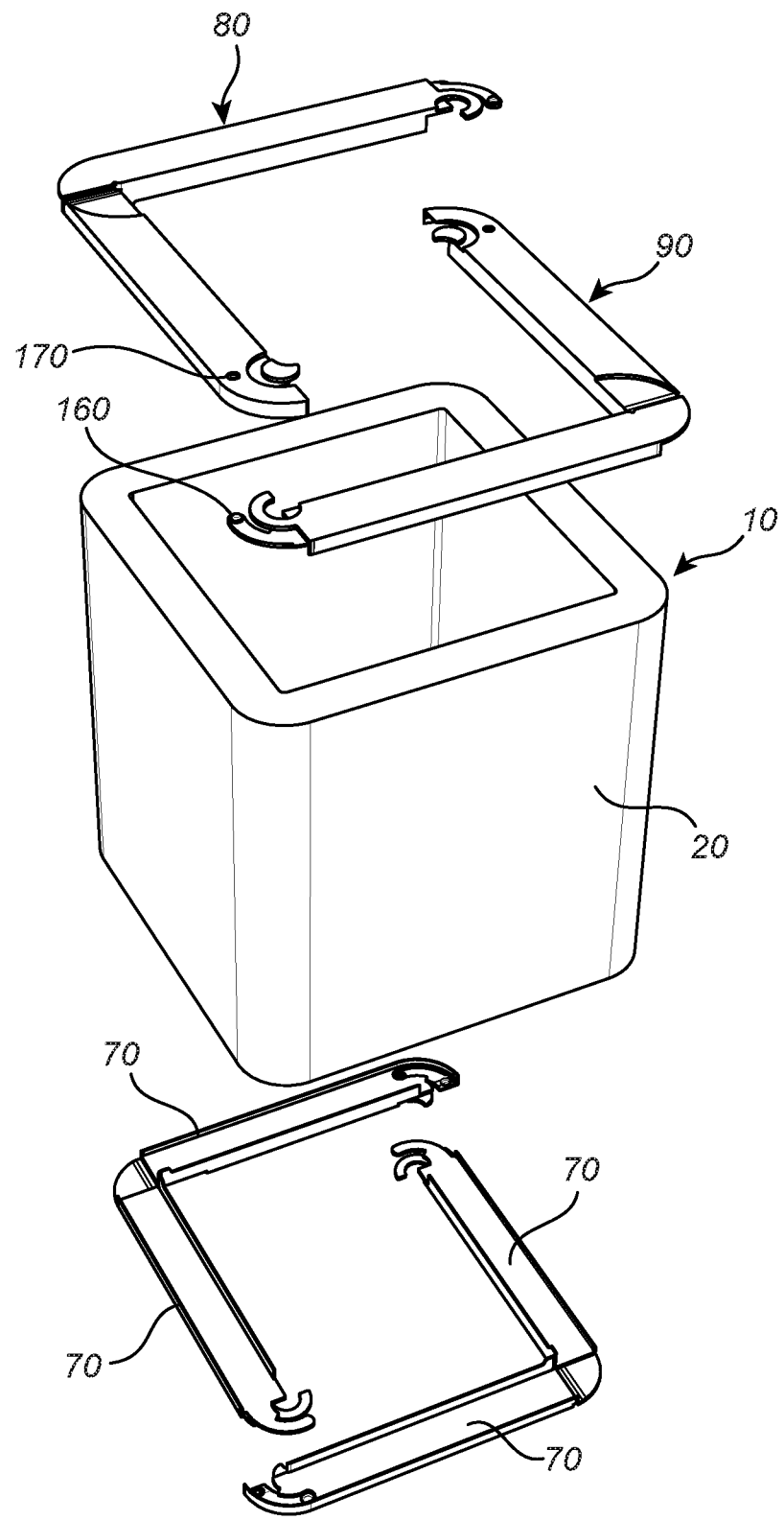
FIG. 3 illustrates an exploded view of the air filter unit.

FIG. 3 illustrates an exploded view of the air filter unit 10 with the filter body 20 separated from the first filter frame 30 and the second filter frame 40 to more clearly illustrate the different parts of the air filter unit.

Figure 4:
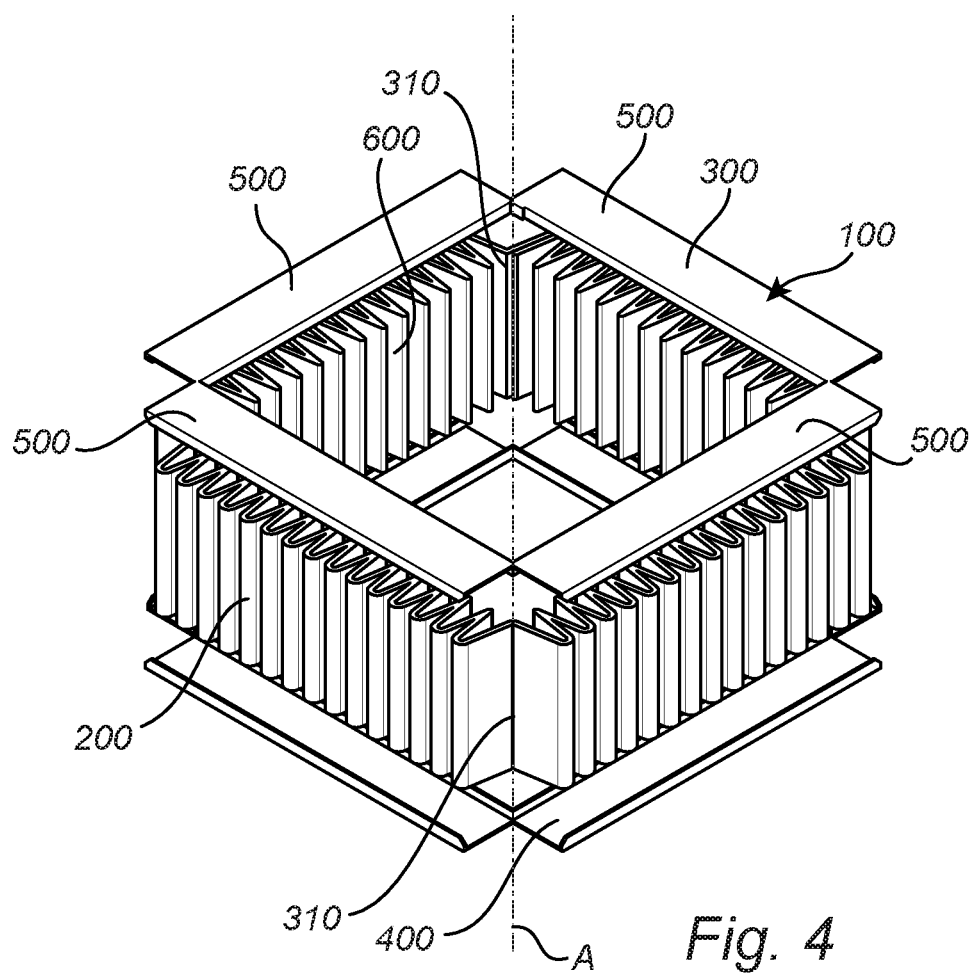
FIG. 4 illustrates an exploded perspective view of a second embodiment of the air filter unit according to the invention.

FIG. 4 illustrates an exploded view of a second embodiment of the air filter unit 100 with the filter body 200 separated from the first filter frame 300 and the second filter frame 400 to more clearly illustrate the different parts of the air filter unit.

This second embodiment the air filter unit 10 has a less complex design and may be suitable for use within smaller appliances for purifying air in smaller spaces such as for example a vehicle cabin. The air filter unit extend along a longitudinal axis A and has the same box-like shape with dimensions selected such that the filter unit fit in a corresponding air purifying device. The air filter unit 100 has a substantially rectangular cross-section transverse to axis A and comprises a filter body 20, a first filter frame 300 and a second filter frame 400 arranged on opposite sides of the filter body along axis A. The filter body 200 comprises four substantially rectangular side walls 600 formed by a folded filter media to provide a filter body with a large filter area. The four side walls are turnably secured to each other along the sides parallel to axis A to prevent that air is leaking between adjacent side walls. The side walls consist of filter media and extends circumferentially around the filter body 30 and have a substantially constant wall thickness. The filter media could have several layers of different materials in order to adapt the filter characteristics to the expected conditions where the filter is used.

The first and second filter frame supports the opposite ends of the filter body to provide the desired structural strength of the air filter unit. Each filter frame comprises four frame members with substantially identical design to reduce the number of different components in the air filter unit. The frame members are made of sustainable paper or plastic material and are substantially rectangular with a length corresponding to the length of the side walls, and a width corresponding to the width of the side walls. The frame members are turnably connected to each other in the inner corners of adjacent frame members to be turnable around axes extending parallel to axis A in each inner corner of the filter frames. This connection could be achieved by a thin elastic and or flexible element 310 made of paper or a plastic material. The air filter unit 100 is moved between the first and second state by pushing the diagonally opposite corners of the air filter unit.

The invention claimed is:

1. An air filter unit for purifying air, the air filter unit comprising:
   a filter body extending along an axis,
   a first filter frame and a second filter frame arranged on opposite ends of the filter body,
   each of the first and second filter frame comprising four elongated frame members turnably secured to each other, and
   the first filter frame is arranged on the top side of the filter body and the second filter frame is arranged on the bottom side of the filter body, and no filter frames or frame members are arranged between the top side of the filter body and the bottom side of the filter body
      wherein the four elongated frame members are turnably secured to each other such that the filter body can be arranged in a first and a second state,
      wherein the first state is such that the filter body is folded to reduce the volume of the filter unit and the second state is such that the filter body is assembled.

2. The air filter unit as defined in claim 1, wherein the filter body, the first filter frame and the second filter frame in the second state have a rectangular cross section transverse to the axis.

3. The air filter unit as defined in claim 1, wherein the filter body comprises four side walls.

4. The air filter unit as defined in claim 3, wherein the side walls are rectangular and turnably secured to each other along the sides parallel to the axis.

5. The air filter unit as defined in claim 3, wherein each elongated frame member comprises a recess such that the frame members are fitted to the corresponding wall of the filter body.

6. The air filter unit as defined in claim 1, wherein the elongated frame members have a substantially rectangular shape and are turnably connected to each other by a thin elastic and/or flexible element in the inner corners of adjacent frame members.

7. The air filter unit as defined in claim 1, wherein each of the first and second filter frames are formed by first and second substantially identical filter frame sections, the first filter frame section comprising two of the four elongated frame members of a respective filter frame and the second filter frame section comprising the remaining two of the four elongated frame members of the respective filter frame.

8. The air filter unit as defined in claim 7, wherein the two elongated frame members of each filter frame section are connected via a foldable element to be turnably connected within a range of 90-180 degrees.

9. The air filter unit as defined in claim 7, wherein the first and the second filter frame sections are connected via a turnable coupling mechanism, the turnable coupling mechanism is turnable within a range of 0-90 degrees.

10. The air filter unit as defined in claim 9, wherein each coupling mechanism comprises a male part arranged on one of the first or second filter frame section and a female part arranged on the other filter frame section, wherein the male and female parts are arranged to turnably secure the first and second filter frame sections to each other.

11. The air filter unit as defined in claim 9, wherein each coupling mechanism comprises a central hub arranged on one of the first or second filter frame section, the central hub defining the axis of rotation for the coupling mechanism.

12. The air filter unit as defined in claim 11, wherein the coupling mechanism further comprises an arc-shaped recess extending around the central hub and a corresponding arc-shaped protrusion arranged on the other filter frame section, wherein the arc shaped protrusion is slidably arranged in the recess when the first and second filter frame sections are assembled.

13. The air filter unit as defined in claim 1, wherein the filter unit is a disposable filter unit.

* * * * *